United States Patent [19]

Bimbi

[11] Patent Number: 5,009,337

[45] Date of Patent: Apr. 23, 1991

[54] AUTOMOTIVE PARTS SUPPORT RACK

[76] Inventor: Domenico Bimbi, 2494 Highmoore Rd., Highland Park, Ill. 60035

[21] Appl. No.: 345,771

[22] Filed: May 1, 1989

[51] Int. Cl.⁵ .............................................. A47F 5/00
[52] U.S. Cl. ...................................... 211/86; 224/314; 224/320
[58] Field of Search .............. 224/309, 314, 319, 320, 224/324, 235, 328; 211/86

[56] References Cited

U.S. PATENT DOCUMENTS

| | | | |
|---|---|---|---|
| 1,896,628 | 2/1933 | Jepsen | 224/320 |
| 2,594,319 | 4/1952 | Law | 224/324 X |
| 2,621,836 | 12/1952 | McMiller | 224/314 X |
| 2,624,497 | 1/1953 | Newman | 224/320 X |
| 2,721,681 | 10/1955 | Daniel | 224/309 |
| 2,985,350 | 5/1961 | Taccolini | 224/319 |
| 3,232,502 | 2/1966 | Kleinbortas | 224/314 X |
| 4,354,625 | 10/1982 | Peoples | 224/325 X |
| 4,449,656 | 5/1984 | Wouden | 224/320 |
| 4,728,244 | 3/1988 | Stokkendal | 224/319 X |

FOREIGN PATENT DOCUMENTS

| | | | |
|---|---|---|---|
| 0151907 | 8/1985 | European Pat. Off. | 224/309 |
| 2494646 | 11/1980 | France | 224/320 |
| 0114633 | 9/1980 | Japan | 224/314 |

Primary Examiner—Carl D. Friedman
Assistant Examiner—Daniel Hulseberg
Attorney, Agent, or Firm—Hill, Van Santen, Steadman & Simpson

[57] ABSTRACT

An automotive parts support rack for holding objects such as automotive parts, the rack being temporarily located on a substantially horizontal surface of a vehicle. The automotive parts support rack has a frame having a substantially rectangular configuration with four corners and having first and second longitudinally adjustable side sections connected respectively by first and second longitudinally adjustable end sections. Each of the first and second side sections and each of the first and second end sections has a holding device for holding the end and side sections at a desired length. At least four means for temporarily supporting the frame on the surface of the vehicle are attached to an underside of the frame at least substantially in the vicinity of the four corners, that is each of the corners have attached in a vicinity thereof a device for temporarily supporting the frame on to the substantially horizontal surface of the vehicle. The rack further has a structure for supporting the objects, the structure being attached to an upper side of the frame.

8 Claims, 7 Drawing Sheets

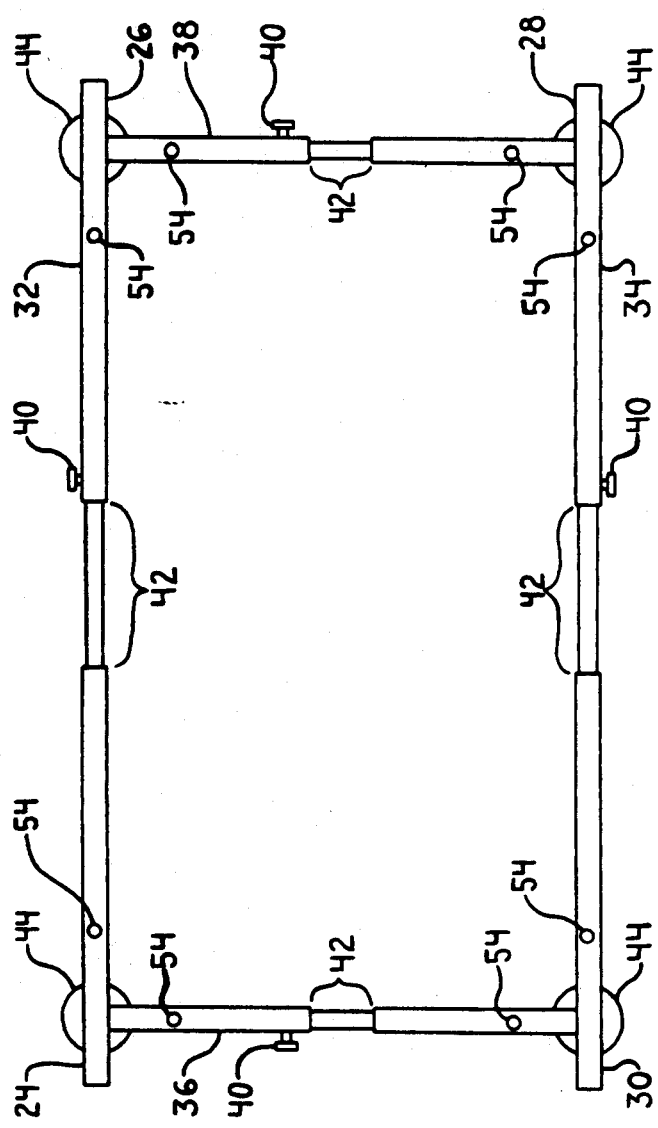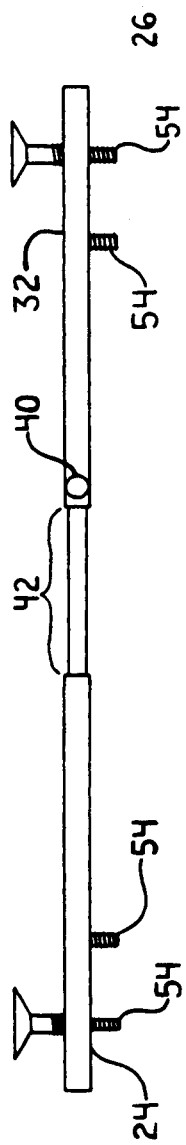

AUTOMOTIVE PARTS SUPPORT RACK

BACKGROUND OF THE INVENTION

The present invention relates in general to support racks used for holding automotive parts and other objects, and in particular, support racks which are used in automotive repair facilities.

It is well known in the prior art that a variety of carts or racks exist which stand on a floor of a repair facility and upon which a repair person who is working on an automotive vehicle can temporarily store parts and other objects such as tools. Typically these carts and racks are on wheels so that they can be moved about the repair facility.

A drawback in the prior art regarding such carts and racks is that space is typically at a premium in automotive facilities. These repair facilities usually have a large number of cars or vehicles which are being worked on at any one given moment within the facility and typically there is very little floor space available for the carts and racks. In addition many times a large number of parts must be temporarily stored while work is being conducted on the vehicle and this requires either significantly large carts and racks or a large number of individual carts and racks.

Since space is very limited and thus only a limited number of carts and racks are typically available, repair personnel many times will place parts and tools on top of the vehicle which is under repair. However, this often causes damage to the surface or paint finish of the vehicle.

The present invention overcomes these drawbacks in the prior art and provides a novel solution to the problem of temporarily storing automotive parts while a vehicle is being repaired.

SUMMARY OF THE INVENTION

The present invention involves an automotive parts support rack for holding objects such as automotive parts, the rack being temporarily located on a substantially horizontal surface of a vehicle. The rack has a frame having a substantially rectangular configuration with four corners and having first and second longitudinally adjustable side sections connected respectively by first and second longitudinally adjustable end sections. Each of the first and second side sections and each of the first and second end sections has a means for holding the end and/or side sections at a desired length. Each of the first and second side sections and each of the first and second end sections is a substantially straight rod having a telescoping portion, the means for holding releasably engaging the telescoping portion to permit the rod to be adjustable, the rod having a substantially square cross-sectional shape, in a preferred embodiment.

At least four means for temporarily supporting the rack on the vehicle securing are attached to an underside of the frame, at least substantially in the vicinity of the four corners, that is each of the corners having attached in a vicinity thereof a means for temporarily supporting the rack on the substantially horizontal surface of the vehicle. The means for temporarily supporting the rack on the substantially horizontal surface of the vehicle can be a suction cup. A means for supporting the objects is attached to an upper side of the frame, the means for supporting the objects being attached to the upper side of said frame by at least one upward projecting leg on the upper side of said frame which engages a corresponding opening, in a bottom area of the means for supporting the objects. Each of the first and second side sections or each of the first and second end sections of the rack has at least one upward projecting leg engaging a corresponding opening in the bottom of the means for supporting objects. Each of the openings is a slot oriented parallel to the section of the rack having the corresponding upward projecting leg which engages the respective slot, thereby allowing the rectangular size of the frame to be changed without removing the means for supporting the objects. The means for supporting the objects can be a substantially flat platform or a substantially open box shaped container, for example.

In an alternative embodiment the means for supporting can be eliminated and large objects can be placed directly on the frame itself.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 3 is a plan view of the FIG. 2 rack;

FIG. 4 is a side view of the FIG. 2 rack;

DESCRIPTION OF THE PREFERRED EMBODIMENT

The present invention has general applicability but is most advantageously utilized as an automotive parts support rack for holding objects such as automotive parts as well as tools or other articles. The rack is temporarily located on a substantially horizontal surface of a vehicle, such as the hood, trunk or roof.

One skilled in the art can appreciate that the rack can be placed and utilized on other suitable horizontal surfaces and it can be appreciated that the horizontal surface need not be perfectly flat but may have various curves or contours, the rack having feet which spaces the rack off of the horizontal surface such that the curve or contour of the horizontal surface would not come in contact with a frame portion of the rack. The feet may be any one of a variety of items such as rubber feet, suction cups or other devices which would not mar the finish of the surface of the vehicle.

An advantage of the automotive support rack of the present invention is that the rack is only temporarily placed on the vehicle and is not permanently attached thereto at any time. The use of rubber feet or suction cups however allows the rack to remain on the vehicle when the vehicle is moved about the repair facility. The present invention also has the advantage that the repair facility has significantly increased storage space by utilizing the substantially horizontal surfaces of the vehicles stored within the repair facility. The present invention thus overcomes a significant problem in the prior art in that repair facilities typically have very limited space and in the past have faced significant problems in storage of parts while vehicles are being repaired. It can also be appreciated that the automotive part support rack of the present invention having a number of objects contained thereon can be lifted off the vehicle in one operation without the necessity of moving all of the objects separately. Also, if the rack is left in place on the vehicle as the vehicle is moved about the repair facility, the parts therefore always stay with the vehicle.

Figure 1:
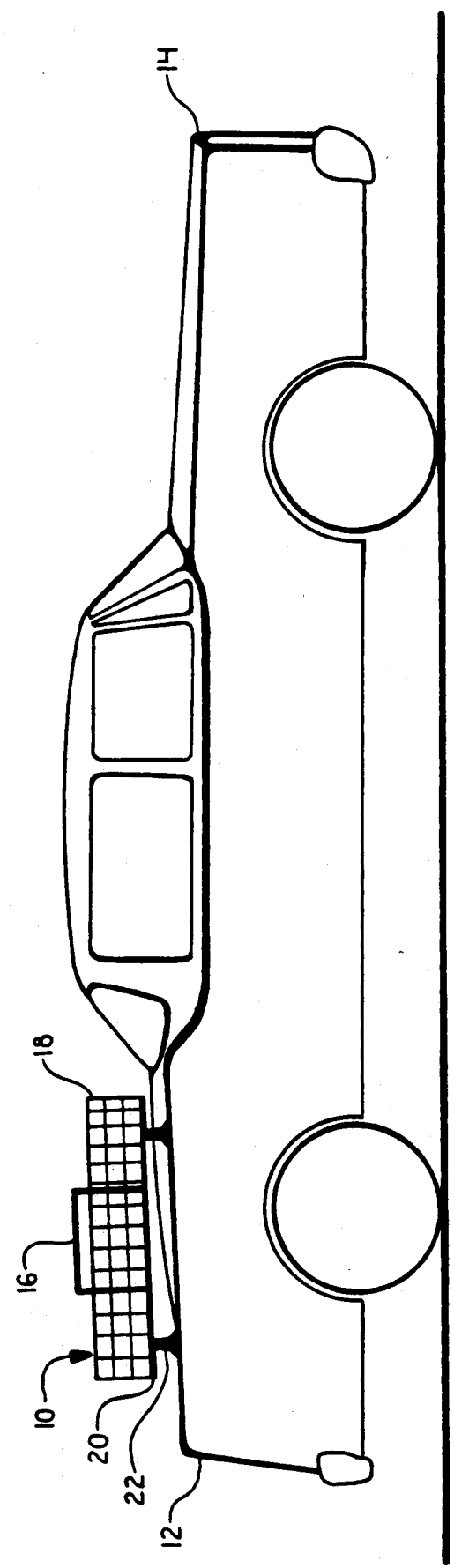
FIG. 1 is a side view depicting the automotive parts support rack located on a roof of a vehicle.

Such an automotive parts support rack 10 is shown in FIG. 1 supported on a hood 12 of a vehicle 14. An object 16 is shown on a means 18 for supporting the object which is attached to a frame 20 of the rack 10. The means 18 for supporting is attached to an upper side of the frame 20 the respective end or side section at a desired length, and feet 22 are attached to an under side of the frame 20.

Figure 2:
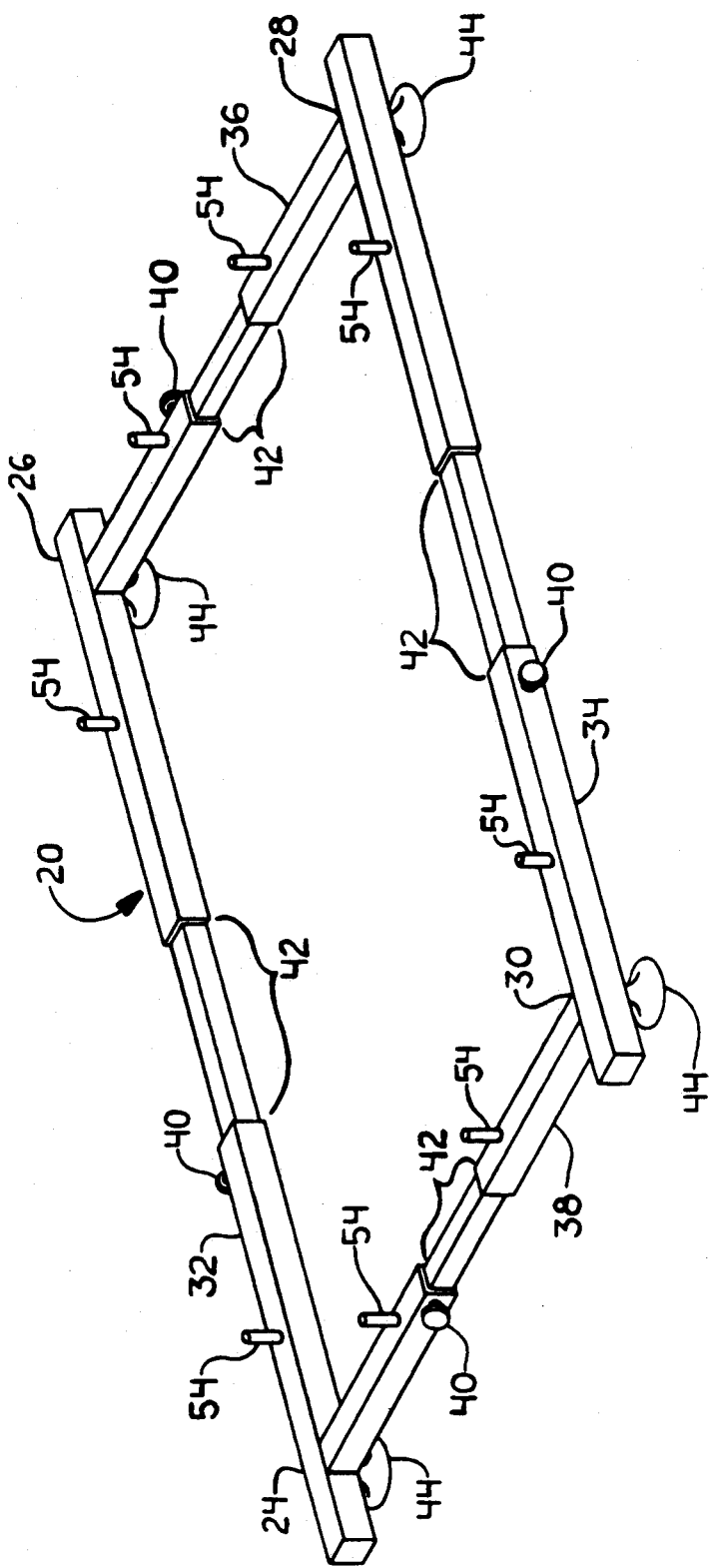
FIG. 2 is a perspective view of a frame which is part of the rack shown in FIG. 1.

The frame 20 is shown in more detail in FIGS. 2, 3 and 4. The frame 20 has a substantially rectangular configuration with four corners 24, 26, 28 and 30. The frame 20 also has first and second longitudinally adjustable side sections 32 and 34 and first and second longitudinally adjustable end sections 36 and 38. Each of the first and second side sections 32 and 34 and each of the first and second end sections 36 and 38 may have a means 40 for holding, only some of which are used at one time. In a preferred embodiment each of the first and second side sections 32 and 34 and each of the first and second end sections 36 and 38 are substantially straight rods having a telescoping portion 42, the means 40 for holding the respective end or side section releasably engaging the telescoping portion 42 to permit the rod to be adjustable. The rod in the preferred embodiment has a substantially square cross-sectional shape as shown in FIGS. 2, 3 and 4.

It can be appreciated by one skilled in the art that various alternative devices can be utilized to effect a longitudinally adjustable side sections and end sections of the frame 20. Furthermore various devices are known in the prior art for functioning as the means 40 for holding a respective end or side section which locks in place the side and end sections after they have been adjusted to a desired length. Also it can be envisioned that either only the side sections or only the end sections can be made adjustable or in the alternative the frame 20 can be simply fixed at one predetermined size. It is to be understood that the reference to a rectangular configuration includes a square configuration of the frame 20.

In the preferred embodiment at least four means for temporarily supporting the frame 20 on the substantially horizontal surface of the vehicle are provided and are suction cups 44. Each corner 24, 26, 28 and 30 of the frame 20 has a suction cup connected in the vicinity of the corner to an under side of the frame 20. It is envisioned that a greater or lesser number of suction cups 44 can be utilized and their placement on the frame 20 can also be varied depending upon the design criteria. In addition the depth of the suction cups 44 which will determine the amount of distance between the under side of the frame 20 and the horizontal surface of the vehicle can be adjustable by various means, such as threaded rods 45 (see FIG. 4) or can be designed for a predetermined distance. As one alternative (see FIG. 9) rubber feet 47 can be used instead of the suction cups 44. It is desirable to use a type of material for the feet which will not mar the finish of the surface of the vehicle which supports the frame 20. An object, such as a trunk lid can be placed directly on the frame 20 while repairs are made to the rear of the vehicle.

Attached to an upper side of the frame 20 is a means 18 for supporting the objects. The means 18 for supporting the objects may take on a variety of configurations such as an open support device generally referred to as means 46 for supporting as depicted in FIGS. 5 and 6, a flat platform 48 as depicted in FIG. 7, an enclosed container 50 as depicted in FIG. 8 or an open box-like cage 52 as depicted in FIG. 9.

Figure 6:
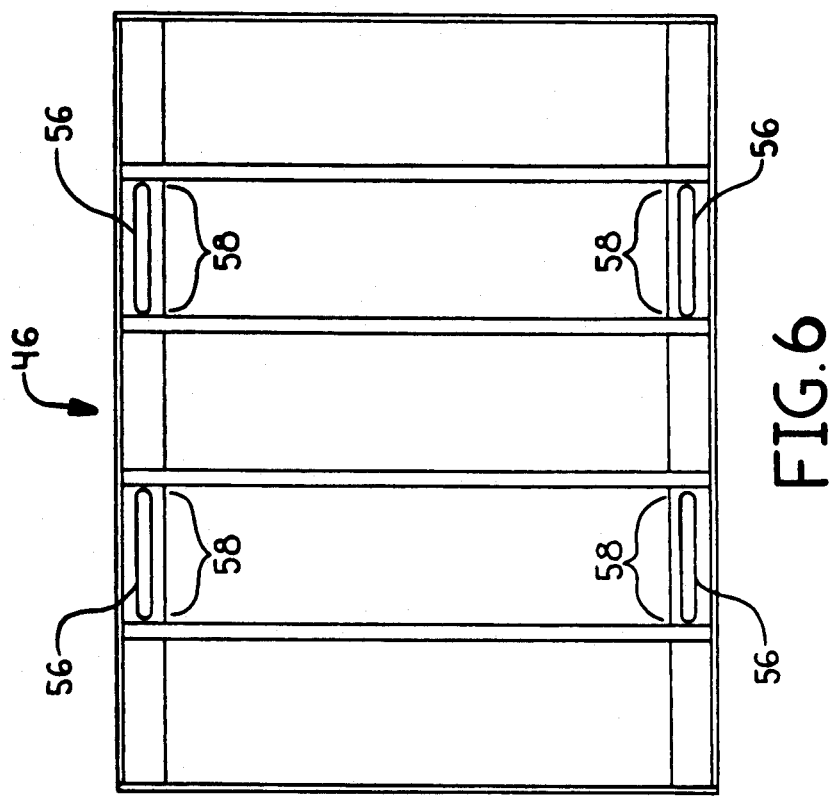
FIG. 6 is a plan view of the FIG. 5 device for supporting objects.
Figure 5:
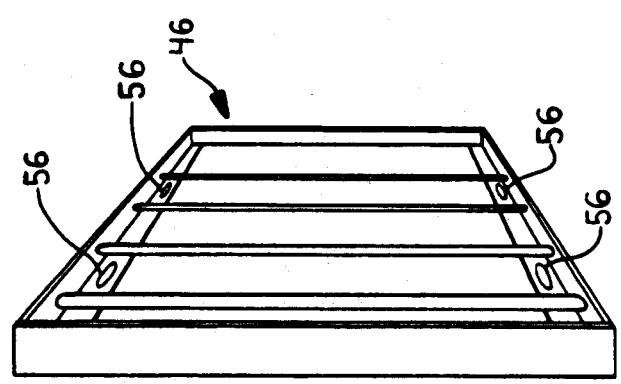
FIG. 5 is a perspective view of a device for supporting objects which is attached to an upper side of the FIG. 2 frame.

As shown for example in FIGS. 5 and 6 the means 46 for supporting the objects is attached to the upper side of the frame 20 by at least one upward projecting leg 54 on at least one of the first and second side sections 32 and 34 and first and second end sections 36 and 38 (see FIG. 1). These upward projecting legs 54 engage corresponding openings such as slots 56 in a bottom area 58 of the means 46 for supporting the objects. As one example, the upward projecting legs 54 may be threaded bolts which engage the slots 56 and a wing nut 55 (see FIG. 9) can be attached to the end of the upward projecting leg 54 which extends through the slot 56. Thus the rack 20 can be adjusted without removing the means 46 for supporting the objects. For the rack 20 to be adjustable as shown in FIG. 2 only upward projecting legs 54 on either the first and second side sections or on the first and second end sections would be utilized so that it would be possible for the upward projecting legs 54 to move in the slots 56. However it can be appreciated that one skilled in the art can use numerous other manners of supporting and attaching the means 46 for supporting to the upper side of the frame 20.

Figure 7:
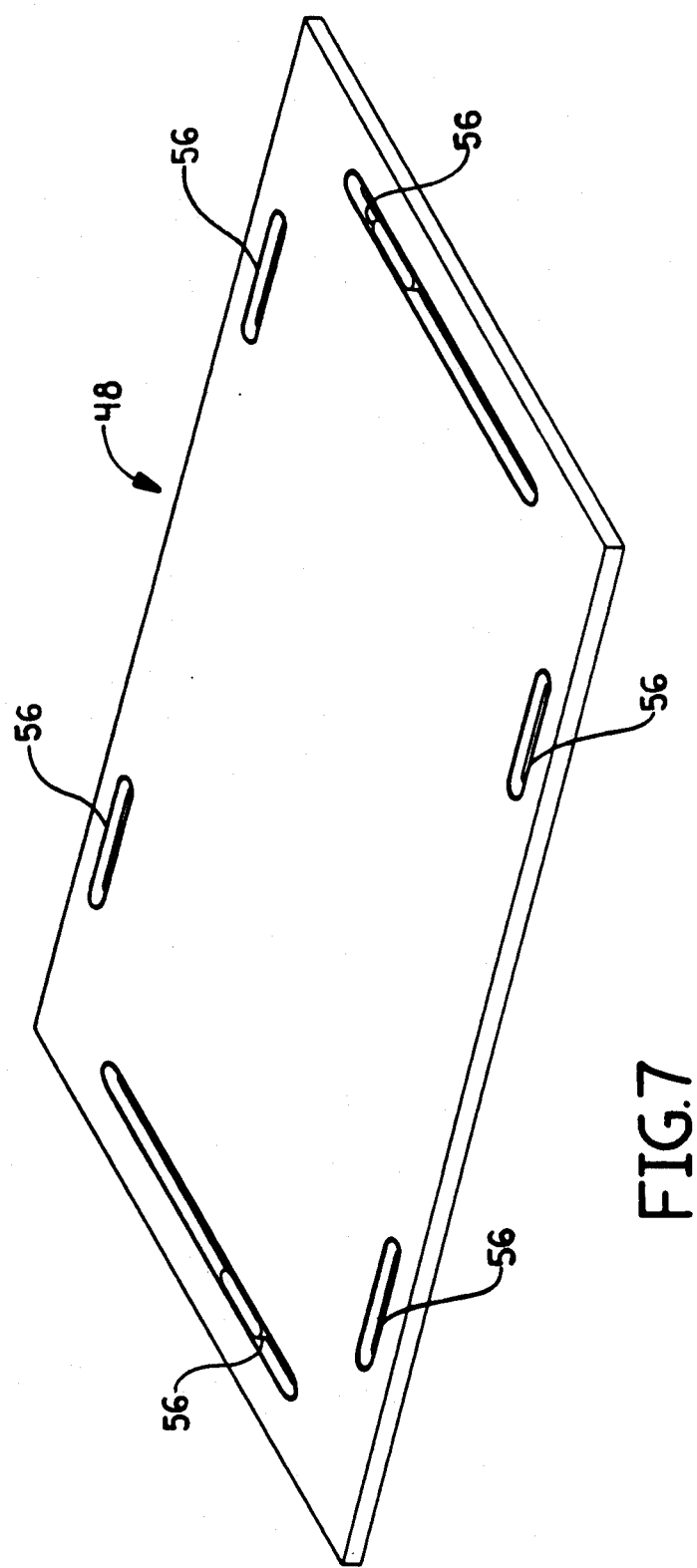
FIG. 7 is an alternative embodiment of the device for supporting objects.

The flat platform 48 depicted in FIG. 7 can be formed of a variety of materials, such as plywood. The slots 56 shown in the platform 48 would only be used in a limited number depending upon the pattern of upward projecting legs 54 on the upper side of the frame 20.

Figure 8:
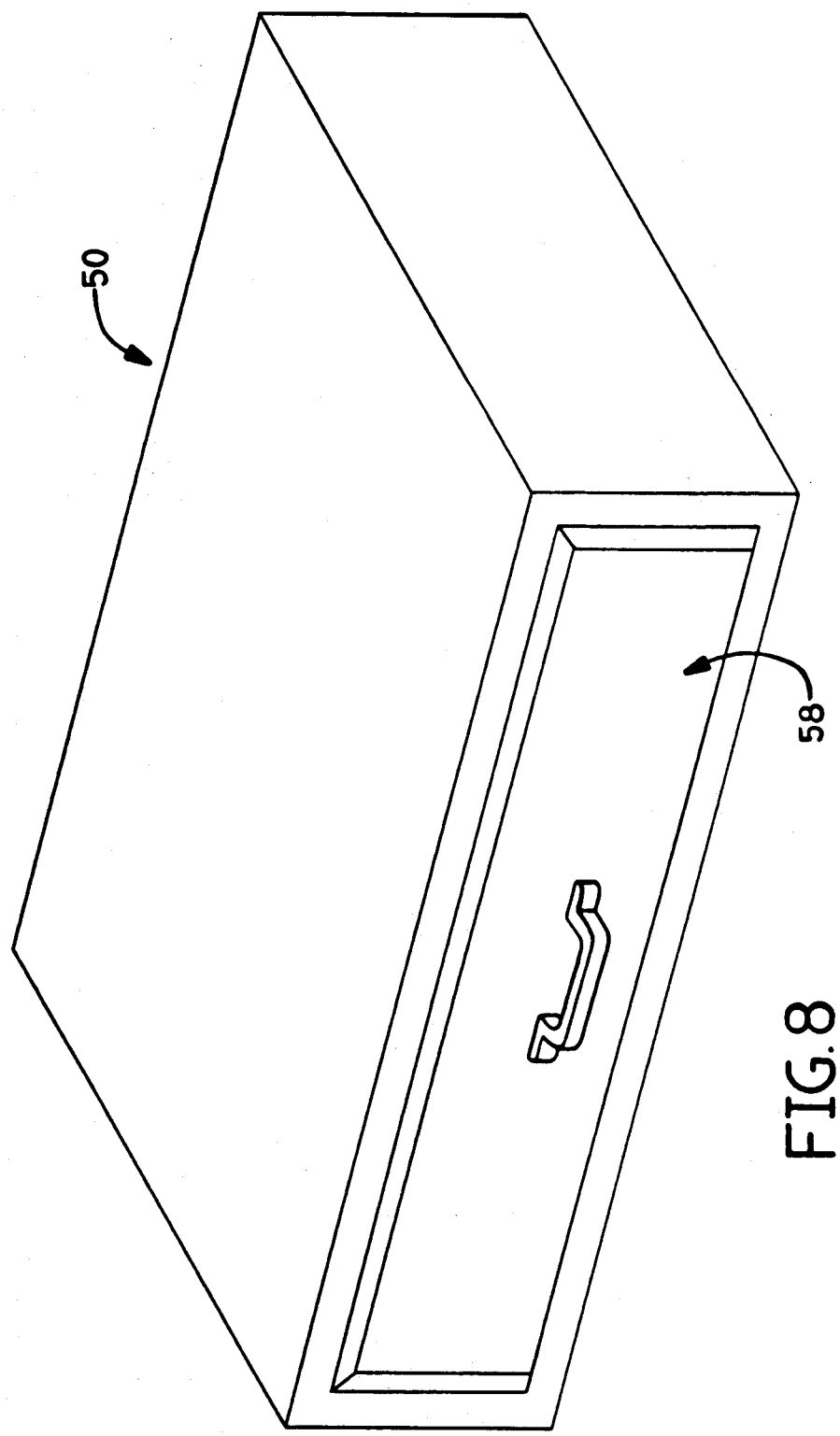
FIG. 8 is another alternative embodiment of the device for supporting objects.
Figure 9:
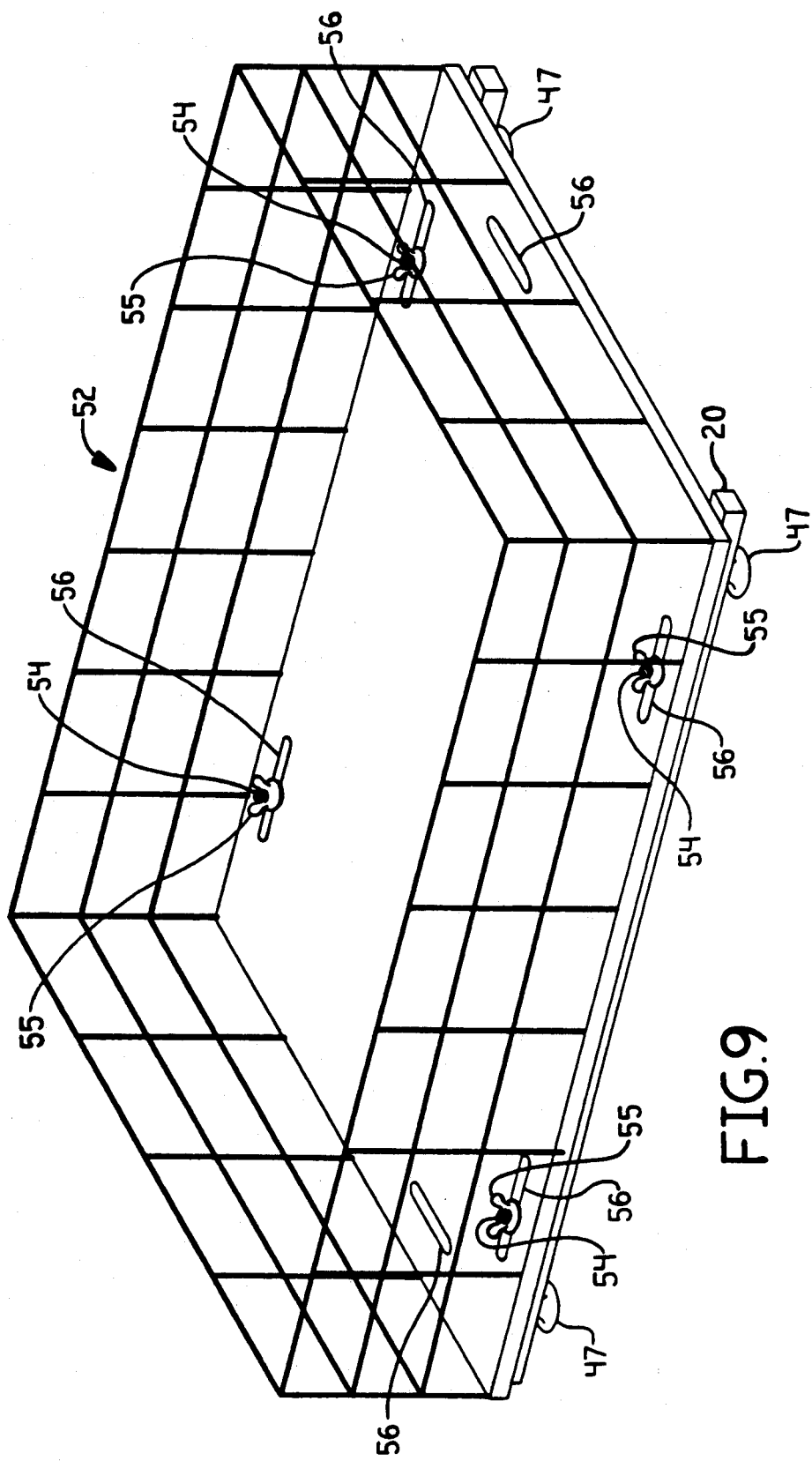
FIG. 9 is a further alternative embodiment of the device for supporting objects and shown attached to the frame of FIG. 2.

The enclosed container 50 depicted in FIG. 8 has a door 58 for allowing access to an interior of the enclosed container 50. A floor (not shown) of the container 50 would be fashioned similarly to the flat platform 48 depicted in FIG. 7 for attachment to the frame 20. As shown in FIG. 9 a cage type structure 52 could be utilized as a means for supporting objects and similarly has a floor 60 which has slots 56 for engaging the upward projecting legs 54 of the frame 20. It can be appreciated by one skilled in the art that the shape of these slots 56 can have other configurations, for example, if the slot were shaped in a T form then it is possible within predetermined limitations for the frame 20 to be adjustable in two directions with the upward extending legs 54 being attached to all of the first and second side sections 32 and 34 and the first and second end sections 36 and 38.

In a most preferred embodiment only one end section 36 would have upward projecting legs 54 which would engage a single long slot 56 such as shown in FIG. 7. The means for supporting objects would then need not be removed from the frame 20, when the frame 20 is adjusted in two directions.

The invention is not limited to the particular details of the apparatus depicted and other modifications and applications are contemplated. Certain other changes may be made in the above described apparatus without departing from the true spirit and scope of the invention. At least four means for temporarily securing are attached to an underside of the frame at least substantially in the vicinity of the four corners, that is each of the corners having attached in a vicinity thereof a means for temporarily securing the rack to the substantially horizontal surface of the vehicle. The means for temporarily securing the rack to the substantially horizontal surface of the vehicle can be a suction cup.

What is claimed is:

1. An automotive parts support rack for holding objects such as automotive parts, the rack being temporarily located on a substantially horizontal surface of a vehicle, comprising:
   a frame having a substantially rectangular configuration with four corners and having first and second longitudinally adjustable side sections connected respectively by first and second longitudinally adjustable end sections, each of said first and second side sections and said first and second end sections having a means for holding the respective side and end sections at a desired length, each of the first and second side sections and each of said first and second end sections being a substantially straight rod having a telescoping portion, said means for holding releasably engaging said telescoping portion to permit said rod to be adjustable;
   at least four means for temporarily supporting the frame on the surface of the vehicle attached to an underside of said frame at least substantially in the vicinity of said four corners, that is each of said corners having attached in a vicinity thereof at least one of said means for temporarily supporting the frame on the substantially horizontal surface of the vehicle; and
   means for supporting the objects having a predetermined rigid configuration, said means for supporting retained on an upper side of said frame, said means for supporting the objects being retained on the upper side of said frame by at least one upward projecting leg on the upper side of said frame which engages a corresponding opening in a bottom area of said means for supporting the objects, at least one of said first and second side sections and said first and second end sections of said rack having said upward projecting leg for engaging said corresponding opening in said bottom of said means for supporting objects, said opening being a slot oriented parallel to the end or side section having the corresponding upward projecting leg, thereby allowing the rectangular size of the frame to be changed without removing the means for supporting the objects.

2. The automotive parts support rack described in claim 1, wherein each of said rods has a substantially square cross-sectional shape.

3. The automotive parts support rack described in claim 1, wherein each of said means for temporarily supporting the frame on the substantially horizontal surface of the vehicle is a suction cup.

4. The automotive parts support rack described in claim 1, wherein at least one of said first and second side sections or said first and second end sections of said frame have upward projecting legs engaging corresponding openings in said bottom area of said means for supporting objects.

5. The automotive parts support rack described in claim 1, wherein said means for supporting the objects is a substantially closed container having a door for access to an interior of said container.

6. The automotive parts support rack described in claim 1, wherein each of said means for temporarily supporting the frame on the substantially flat surface of the vehicle is a rubber foot.

7. The automotive parts support rack described in claim 1, wherein said means for supporting the objects is a substantially flat platform.

8. The automotive parts support rack described in claim 1, wherein said means for supporting the objects is a substantially open box shaped container.

* * * * *